June 2, 1936.  K. A. HARMON ET AL  2,043,042

MAGNETO

Filed Jan. 17, 1935   3 Sheets-Sheet 1

INVENTORS
KENNETH A. HARMON AND
BY RALPH W. CROCKER
Chapin + Neal
ATTORNEYS

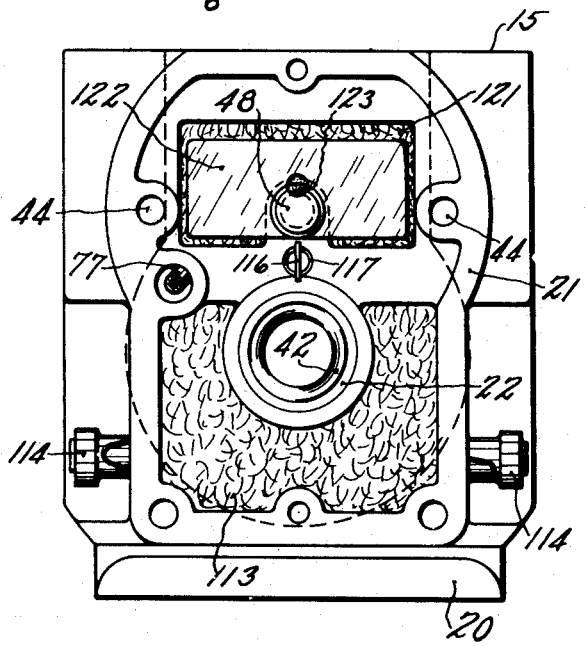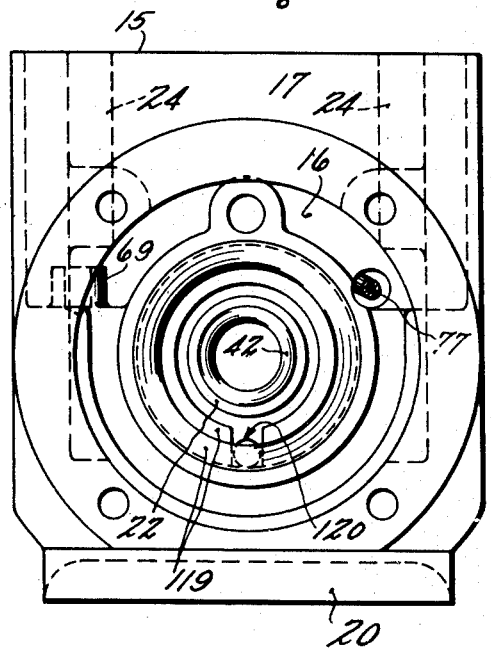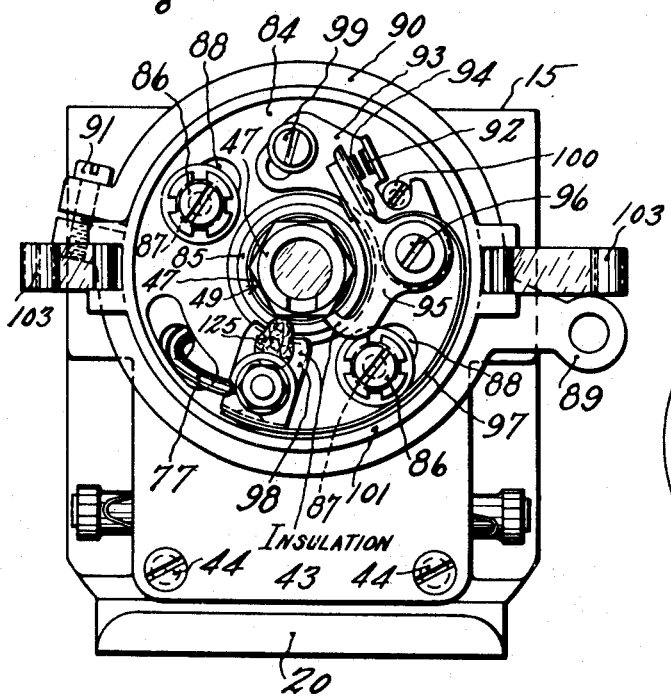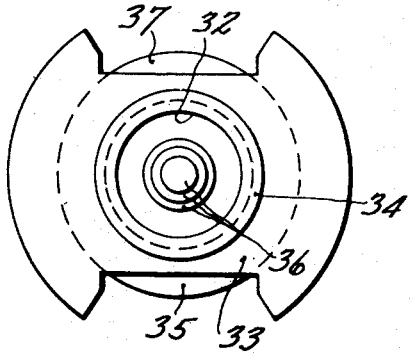

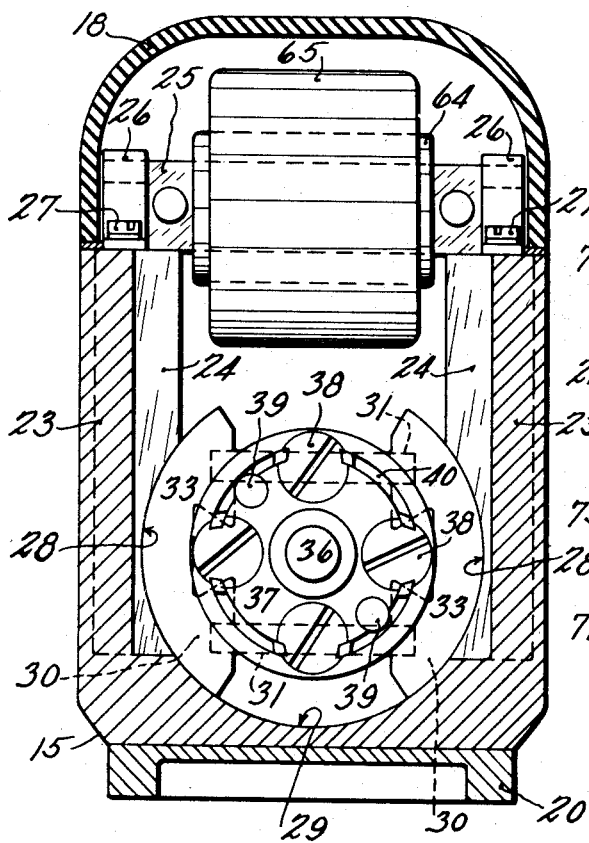

Patented June 2, 1936

2,043,042

UNITED STATES PATENT OFFICE 2,043,042

MAGNETO

Kenneth A. Harmon and Ralph W. Crocker, West Springfield, Mass., assignors to Wico Electric Company, West Springfield, Mass., a corporation of Massachusetts Application January 17, 1935, Serial No. 2,148

12 Claims. (Cl. 171—252)

This invention relates to an improved magneto.

The magneto of this invention is of a general type already well known in the art. It embodies magnetic and electrical circuits which are well known and it functions in an old and well known way. The improvements of this invention relate primarily to mechanical features of the magneto.

The general object of the invention is to provide a compact, highly efficient magneto of rugged construction, which is susceptible to manufacture in quantity at low unit cost and which is calculated to give a long life of useful service with a minimum of attention and care.

A particular object of the invention is to provide for an improved mounting of the rotor of the magneto, characterized in that the rotor shaft is supported in two spaced bearings, preferably of the anti-friction type, both bearings being provided inside the same member which is of elongated form, fixed at one end in the magneto frame and extending entirely through the rotor. The mounting is such that both bearings may be machined with precision in an accurate alignment, which cannot thereafter be disturbed since both bearings are fixed in one piece. It is also such that any eccentricities, which may exist in the bearings cannot be multiplied to produce a greater eccentricity of the rotor. The machining for the rotor bearings may be effected at the same time that the stationary pole pieces are machined and these pole pieces are permanently fixed in the same frame as the bearing sleeve so that the accurate relationship between the bearings and pole pieces cannot be disturbed. With this construction, it is practical and safe to employ an exceedingly close running fit between the rotor and pole pieces, thereby deriving increased efficiency due to diminution of the air gap between the relatively movable elements of the magneto.

Another object is to provide in a mounting for the rotor which enables the rotor and its shaft to be withdrawn as one unit from one end of the bearing sleeve, for the use of anti-friction bearings to support the rotor shaft in said sleeve, both of the bearings being of the same diameter and of exceedingly small diameter and both located in the same member but on opposite sides of a central plane extending vertically and transversely through the rotor. The invention, by utilizing needle bearings, provides an anti-friction support for the rotor shaft without an excessive increase in rotor diameter such as would be necessary if ball or roller bearings were used.

Another object of the invention is to provide a magnetic rotor of improved construction, in which the permanent magnets of short bar form are disposed transversely of the axis of the rotor and on opposite sides thereof and interconnect two spaced pole shoes of laminated iron,—the shoes and magnets being held together by a body of die-cast, non-magnetic metal in an improved manner.

Another object is to provide an improved circulatory lubricating system for lubricating the moving parts of the magneto from a single source.

Other objects will appear as the detailed description proceeds and will be pointed out in the appended claims.

The invention will be disclosed for illustrative purposes in the accompanying drawings, in which:

Fig. 4 is an elevational view of the right hand end of the housing shown in Fig. 2;

Figure 1:
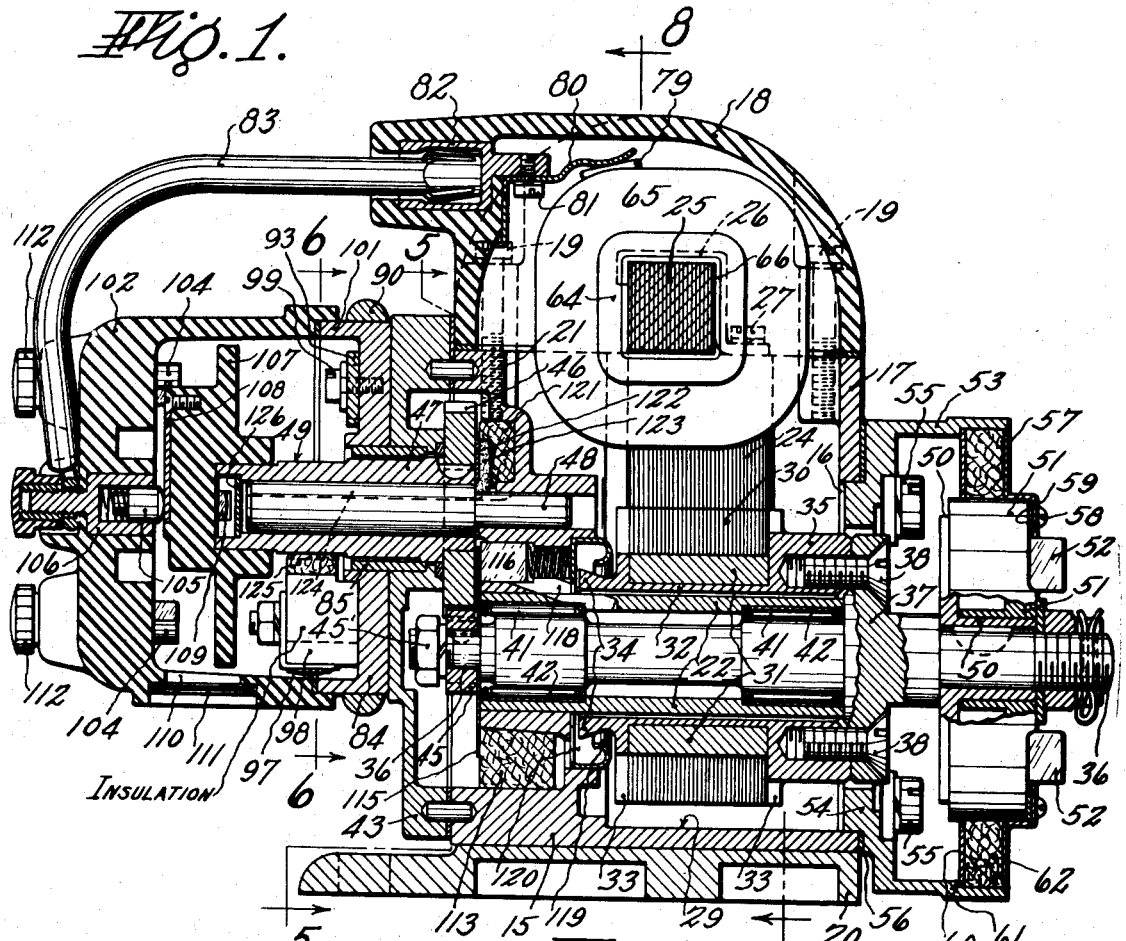
Fig. 1 is a sectional elevational view of a magneto embodying the invention.

Figs. 5 and 6 are cross sectional views taken on the lines 5—5 and 6—6, respectively, of Fig. 1;

Fig. 7 is an end elevational view of the rotor, taken from the left hand end, as viewed in Fig. 1;

Fig. 8 is a cross sectional view taken on the line 8—8 of Fig. 1;

Fig. 9 is a top plan view of the magneto, as it appears with the cap removed;

Fig. 10 is a fragmentary sectional view illustrative of the mounting of the condenser unit; and Fig. 11 is a cross sectional view of the rotor.

Figures 2, 3:
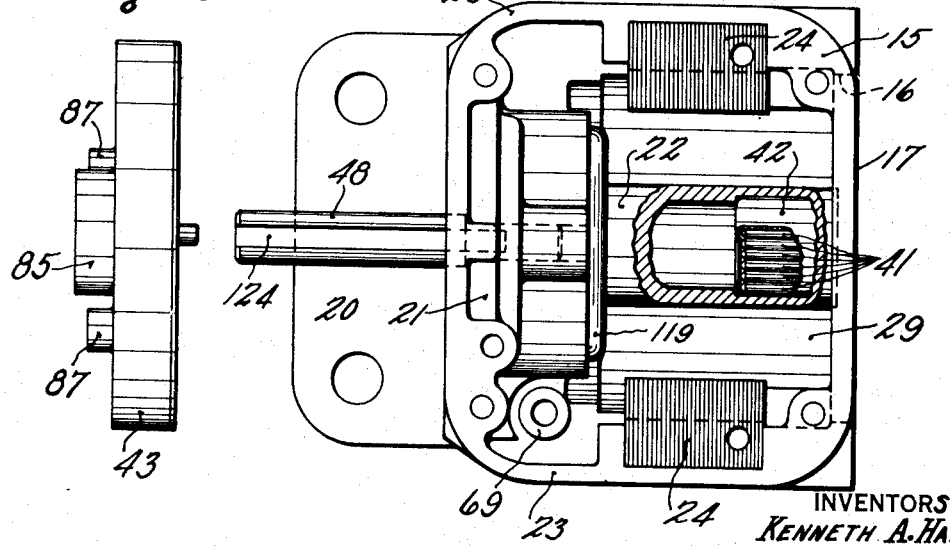
Fig. 2 is a top plan view, with parts of the rotor support in section, of the housing or main frame unit of the magneto.
Fig. 3 is a top plan view of the gear case cover.

The magneto includes a frame member 15, herein shown as of hollow, box-like formation, open at its upper end and having a large circular opening 16 in one side wall 17 (Figs. 2 and 4). Located within member 15 and supported therefrom, are the magnetic rotor, the generating coils, the core of said coil and pole pieces for the core to cooperate with the magnetic rotor. A cap 18, herein shown, as of bakelite or other suitable insulating material, is secured by cap screws 19 to the member 15 and closes the upper end of the latter. The member 15 and cap 18 thus serve as an enclosure for all of the generating elements of the magneto. As shown herein, the member 15 is fixed to a sub-base 20 with which it is sometimes, although not always, used.

The member 15 is of suitable non-magnetic metal,—say for example aluminum,—and it may advantageously be formed by die casting. It is shown separately in Figs. 2 and 4. Suitably fixed at one end in a side wall 21 of member 15, opposite from the wall 17, is a tube or bearing sleeve 22, which projects toward wall 17 and serves in a manner to be described, to rotatably support the rotor of the magneto. Preferably, the sleeve 22 is fixed in wall 21 during the process of casting member 15. Suitably fixed, one in the inner face of each end wall 23 of member 15 and preferably during the casting process, are vertically-disposed, laminated elements 24 (Figs. 2 and 8) of magnetic material, such as soft iron. The upper ends of elements 24 are faced off to receive the ends of a laminated core element 25, of magnetic material such as soft iron,—the element 25 bridging across and interconnecting the upper ends of elements 24 (Figs. 8 and 9) and forming therewith a magnetic conducting member of roughly the shape of an inverted U (Fig. 8). The ends of the core 25 are fixed one to each of the upper ends of elements 24 by clips 26 secured by cap screws 27, threaded into elements 24. The adjacent faces of the vertical elements 24, near their lower ends form pole pieces and are machined to provide opposed, curved surfaces 28 (Fig. 8) for cooperation with the pole shoes of the rotor. These surfaces, as shown, merge with the curved and machined inner surface 29 of the bottom wall of the housing member 15,—these several surfaces being parts of one smooth cylindrical surface concentric with the axis of the rotor. The lower parts of elements 24 are not of course magnetically connected except by the rotor, as hereinafter described.

The rotor includes two diametrically-opposed, pole shoes 30 (Fig. 11) and a plurality (two as shown) of permanent magnets 31 of short bar form, interconnecting the pole shoes and disposed one on each side of the axis of rotation of the rotor. The pole shoes are built up of soft iron laminations (Fig. 1) and their machined outer surfaces are curved concentrically with the surfaces 28 from the axis of the rotor as a center (Fig. 8). The laminated pole shoes 30 and the magnets 31 are assembled in the form shown in Fig. 11 and placed in a mold, which is thereafter filled with non-magnetic metal such as aluminum. To temporarily hold the laminations and magnets assembled in proper relation, two thin brass plates 30' are applied, one to each end face of the assembly, and secured thereto by rivets 31' which pass through the laminated shoes 30. The magnets and pole shoes and plates 30' are imbedded in the cast metal and securely held together thereby. The die-cast metal is formed into a central hollow core 32 (Figs. 1 and 11), end plates 33 (Figs. 1, 7 and 8), one on each side of the pole shoes, an oil slinger 34 (Figs. 1 and 7) and a hub 35 (Fig. 1),—all integrally connected. The bore of the core 32 is larger than the outside diameter of sleeve 22 and thus freely encompasses the latter. An important feature of the rotor construction is the provision of recesses of dovetail, or equivalent form, one in each inner face of each pole shoe 30 (Fig. 11). These recesses become filled with the cast metal and, when this metal shrinks, it pulls the pole shoes 30 together and presses them firmly into the desired close contact with the ends of the magnets.

The rotor is fixed to a shaft 36 (Fig. 1) which extends through sleeve 22 and beyond both ends of the same and is mounted in a pair of anti-friction bearings in the sleeve. As shown, this shaft has a flange 37 thereon, one end face of which abuts the end face of the hub 35 on the rotor and is secured thereto by a plurality of large screws 38 (Figs. 1 and 8) which pass through the flange and are threaded into the hub. To maintain the flange and hub in true concentricity, dowel pins 39 (Fig. 8) are fixed in the hub and pass through and closely fit holes in the flange. The screws 38 are preferably locked in place by indenting portions of their heads into a circular groove 40 formed in the outer end face of the flange 37 (Fig. 8). Both flange 37 and hub 35 are of sturdy construction and they are firmly held together so that the rotor is rigidly held to, and in spaced concentric relation with shaft 36. Within the sleeve 22 are needle bearings, one near each end thereof,—the needles being designated 41 and the retaining ring 42. These afford anti-friction bearings for the shaft and the result is accomplished without necessitating an increase in size of the rotor.

One end of shaft 36 extends into a gear case formed between the recessed outer face of wall 21 and the recessed inner face of a cover 43, secured to wall 21 by cap screws 44. On said end of the shaft is keyed a pinion 45 (Fig. 1) which is held in place by a nut 45' and drives a gear 46,—in this case having a pitch diameter three times that of the pinion. The gear is fixed to the inner end of a member 47 which is rotatably mounted on a stud 48 fixed at one end in wall 21. Member 47 is provided with a hexagonal part 49 serving as a cam for operating the breaker point mechanism. The arrangement shown is adapted for a six cylinder engine and may be varied as desired, to suit engines having a different number of cylinders.

The other end of shaft 36 is adapted for connection to the engine in any suitable way. As herein shown, shaft 36 is driven through an impulse coupling which may be of any of the well known types and need not be described in detail. Suffice it to say that the two relatively rotatable elements of the coupling are designated 50 and 51 in Fig. 1, and one (50) is keyed to shaft 36 while the other (51) is mounted for limited degree of rotation on the other and is driven from the engine through a coupling element engageable with the lugs 52, formed on the outer face of element 51. The element 51 in this case is intended to be driven from the cam shaft, or at half the speed of the crankshaft of the engine. The impulse coupling is intended to function, at low engine speeds only, to impart periodically, quick movements to the rotor. At higher engine speeds the two elements 50 and 51 turn in unison, as if rigidly coupled together.

The impulse coupling is encompassed by a cup shaped case 53 having an annular part 54 fitting in hole 16 of the side wall 17 of the housing 15 and apertured to allow flange 37 of shaft 36 to freely pass therethrough. The flat end face of the cup shaped case is secured to wall 17 by screws 55, a gasket 56 being interposed between said face and wall to seal the joint. The outer and open end of the cup shaped case 53 is closed in dust proof fashion in the following manner. A thin annular disc 57 is secured by screws 58 to the outer end face of the element 51 of the impulse coupling and a gasket 59 seals the joint between them. The external diameter of disc 57 is just slightly less than the internal diameter of the outer part of the cup shaped case 53. A second annular disc 60 seats against a shoulder 61 in the cup-shaped case in axially spaced relation with the first disc and a felt washer 62 fills the space between them and engages the inner periphery of the case and the outer periphery of element 51. When this case is removed, the shaft 36, with the rotor mounted thereon, may be withdrawn,—the hole 16 being slightly larger than the external diameter of the rotor. To remove the shaft and rotor, it is first necessary to remove pinion 45 from the shaft.

The generating coils comprise primary and secondary coils 64 and 65 respectively. The primary coil is wound on a tubular core 66 of square cross section which can be readily slipped over core 25. The secondary coil is wound over the primary coil. A condenser, mounted in a cartridge-like case 67, is provided and this case is mounted as shown in Fig. 10 with its axis vertically disposed, in one corner of the housing 15. The lower end of the condenser case has a spring jaw terminal 68 which telescopes over an upstanding cylindrical stud 69 in member 15 and this forms the ground terminal for the condenser. The other terminal of the condenser consists of a threaded stem 70 which passes through a block of insulation 71 and a nut 72 holds the latter to the condenser case. The block 71 is secured to the housing 15 by a screw 73, beneath the head of which one terminal of each of the coils 64 and 65 is connected and thus grounded (Fig. 9). The ground wires of coils 64 and 65 are shown in Fig. 9 at 74 and 75, respectively, as twisted together and one of them is fastened beneath screw 73. The other terminal of the primary coil is connected by a wire 76 to stem 70 and a wire 77 leads from this stem to the breaker point mechanism,—both wires 76 and 77 being held between nut 72 and a second nut 78. The other terminal of the secondary winding is the metallic button 79 which is engaged, when cap 18 is in place, by a spring finger 80 (Fig. 1) secured by screw 81 to the inner end of a metallic socket 82, embedded in cap 18. This socket is adapted to receive one end of the high tension wire 83 which leads to the distributor.

The breaker point mechanism is carried by a plate 84 (Figs. 1 and 6), which is pivotally mounted on a sleeve 85, fixed in the cover plate 43 and encompassing the member 47. This plate is held to cover plate 43 by screws 86 (Fig. 6), threaded into studs 87 which pass through slots 88 in the plate 84. The slots are curved concentric with the axis of stud 48 and limit the angular movement of the plate. An operating arm 89, having a split collar 90 encompassing the plate 84 and clamped thereto by a screw 91, is provided and by turning this arm, the plate 84 and the breaker point mechanism and distributor carried thereby, as will later appear, may be shifted relative to cam 47 to vary the timing of the spark. The breaker point mechanism comprises a breaker point 92, carried by a bracket 93 fixed to plate 84 and thereby grounded, and a movable breaker point 94, fixed to one end of an arm 95 of insulating material, which arm is pivoted intermediate its ends on a stud 96. The other end of arm 95 is formed as a cam follower to engage cam 47. A flat spring 97 is secured at one end to arm 95 in electrical contact with point 94 and at the other end to a block 98 of insulation fixed to plate 84. This spring serves to hold the cam follower engaged with its cam 47 and also serves as a conductor to connect the movable breaker point 93 to the wire 77, above described. The stationary breaker point is adjustable when screw 99 is loosened, by turning an eccentric stud 100,—both stud and screw engaging in suitable slots in bracket 93, as shown, and the bracket being pivoted on the stud 96.

The plate 84 which carries the breaker point mechanism has a cylindrical flange 101, over which telescopes one end of the insulating casing 102 of the distributor (Fig. 1.) Spring clips 103 (Fig. 6), pivoted at diametrically opposite points to plate 84, serve in the usual way to hold the distributor case to the plate in a manner enabling it to be conveniently detached when required. The case carries a suitable number, six as shown, of contacts 104 (Fig. 1) arranged in a circular series, and a centrally arranged, spring-pressed brush 105 which is slidably mounted in a socket 106 in the case. The wire 83 is connected to this socket. A disc 107 of insulating material carries the metallic distributor arm 108, the inner end of which is engaged by brush 105 and the outer end of which is adapted to move in a path in close proximity to the contacts 104. The disc 107 slidably fits the outer end of the hollow shaft 47 and has a lug 109 which engages in a recess in the end of the shaft 47, as shown in Fig. 1, whereby the disc is caused to turn with the shaft. The case has a ventilation opening 110 in its lower peripheral portion,—such opening being covered by a screen 111. Each contact 104 has a binding post 112 connected thereto and to these posts the spark plug wires are adapted to be connected.

The magneto is provided with a circulatory lubricating system for all its moving parts. In the lower part of the recessed part of wall 21 (Figs. 1 and 5) is formed a reservoir for lubricant,—such reservoir having therein a pad 113 of felt or other suitable absorbent material. Oil is supplied to this pad when required, by way of oil cups 114 (Fig. 5) of ordinary form. A disc 115 (Fig. 1), fixed to shaft 36, bears against the outer face of the oil-soaked pad 113 and receives oil therefrom. A spring-pressed scraper 116, slidably mounted in diametrically opposed slots in a cylindrical hole 117 (Fig. 5) serves to remove oil from the upper part of disc 115 and such oil passes through hole 117 and into an inclined passage 118 (Fig. 1) which extends through the sleeve 22 into the interior thereof. Oil flows to the right and left inside sleeve 22 and lubricates both sets of needle bearings. Any oil discharged from the left hand bearing will flow directly back into the reservoir. Oil discharged from the right hand needle bearing passes between the end face of sleeve 22 and flange 37, thus lubricating the "thrust" bearing. Thence, the oil flows to the left between the exterior of sleeve 22 and the core 32 of the rotor and is discharged by the oil slinger 34, being caught in an oil catcher ring 119. Oil caught by ring 119 drains to the bottom thereof and thence passes by way of a hole 120 in ring 119 back to the reservoir. Above the reservoir, and mounted in a recess in wall 21, is a second pad 121 of felt or other suitable material, which pad is held in place by a thin plate 122 against which gear 46 presses. A wick 123 has an upturned end which is engaged between plate 122 and pad 121 and another portion which extends through a groove 124 formed in the upper peripheral portion of stud 48. Oil is supplied to the pad 121 from the periphery of disc 115, being thrown therefrom by centrifugal force, and is fed to the stud 48 to lubricate member 47 by wick 123. The outer end of member 47 is closed by a disc 126 to prevent escape of oil into the distributer. The insulating block 98 carries a piece of felt 125 or the like which is saturated with oil and serves to lubricate the cam 49.

In operation, the magneto is coupled to the engine so that shaft 36 turns at one and one-half the speed of the crankshaft of the engine. The rotor, twice each revolution, will magnetically connect the pole pieces 24 and establish flux through core 25. This condition is illustrated in Fig. 8. Later, the magnetic circuit so established, is broken and the resulting change of flux is utilized to induce a current in the primary coil 64. This coil is in a circuit which is normally closed and is controlled by breaker points 92 and 94, and these points periodically open (twice each revolution) and induce a high tension current in secondary coil 65. Since two sparks are produced for each revolution of shaft 36, and since this shaft runs at one and one-half the speed of the engine, the magneto thus produces the three sparks per revolution required for the engine. The high tension current is distributed in the usual way, by the described distributer, to the several spark plugs in the cylinders of the engine.

It will be obvious that the magneto may readily be adapted for ignition with engines having a different number of cylinders by changing the distributer and the gear ratio between shafts 36 and 47. Also, that the distributer may be omitted when the magneto is used for igniting a single cylinder engine. So also, the impulse drive is optional and may be used or not as desired.

The important features of the invention relate more especially to the construction inside housing 15. The housing,—a die casting,—has embedded in it the laminated pole pieces 24 and the bearing sleeve 22. To prepare this casting, the outer face of end wall 21 is first faced off. Then this casting is mounted on the finished face of wall 21 in the indexing head of a turret lathe and sleeve 22 is bored for the rear bearing. Then the indexing head is turned 180 degrees and sleeve 22 is bored for the front bearing and thereafter the pole piece surfaces 28 and surface 29 are machined. In this way, exact alignment of the rotor shaft bearings can be obtained and true concentricity between the surfaces 28 and 29 and the rotor bearings secured. The hole for stud 48 is also formed while the casting is held in the turret lathe. At the same time, the end wall 17 may also be faced off to receive casing 53. There remains simply to tap the various holes for the retaining screws and to grind off the upper ends of members 24. The machining is reduced to a minimum of operations, each of a simple nature, capable of being performed expeditiously and with accuracy by methods adapted to quantity production at low unit cost. The rotor casting is placed in a chuck and the flange 35 faced off and the holes drilled therein for dowels 39 and screws 38. Then the rotor is mounted on the finished face of flange 35 and the peripheral surfaces of shoes 30 ground to size. The shaft 36 is readily formed by simple turning operations and is then placed in a jig and the holes drilled in flange 37.

The assembly of parts is easily and quickly effected. The shaft and rotor are fastened together by the screws 38 and pins 39,—the latter assuring exact concentricity between the rotor and shaft. The bearings are slipped into sleeve 22. Then shaft 36 is inserted. The pad 113 is put in place in its recess in wall 21. Then the disc 115, pinion 45 and nut 45' are applied to the rear end of the shaft 36 and nut 45' tightened up until the end play of the shaft 36 is taken up to the desired degree. The impulse drive, if used, is then applied, and if not used, a suitable casing is applied in its place to cover hole 16. Then, the coils are slipped over core 25 and the latter laid in place on the tops of elements 24 and secured thereto. The condenser 67 is put in place, the electrical connections made and cap 18 put in place. Then the pad 121, wick 123 and plate 122 are put in place. The shaft 47 with gear 46 thereon is slipped over stud 48, after which the cover 43 is applied and bolted in place. The timer unit on plate 84 is then slipped in place on sleeve 85 and fastened by the screws 86. Then the distributer arm 107 is put in place on the end of shaft 47 and cap 102 applied and wire 83 connected thereto. It will be clear that the design is such as to facilitate rapid assembly of parts without requiring great skill on the part of the workman.

The mounting of the rotor is most important where, as here, it is desired to reduce to an exceedingly small minimum the air gap between the rotor shoes 30 and their cooperating pole pieces 24. To secure the desired close fit of these parts, it is essential that the rotor be supported by two bearings, that these bearings be aligned with accuracy, and that the rotor shoes and surfaces 28 of the pole pieces 24 be truly concentric with the rotor shaft. As has been shown, the pole pieces and bearing sleeve can be machined with precision to secure the desired concentricity and to secure exact alignment of the bearings. Since these parts are permanently fixed in the housing 15, their accurate relationship cannot be readily altered. It has also been shown that the rotor can be secured in true concentricity with the shaft. Thus, the desired accuracy in the fit of the parts can be obtained without any of the usual difficulties such as are incident to aligning two bearings in cases where the bearings are formed in two separate members bolted together or to some other member. It should be noted that the rotor shaft is supported by two widely spaced bearings, both located in the same member and on opposite sides of a central plane passing vertically and transversely through the rotor. With this arrangement any small eccentricities in the bearings are not found multiplied in a larger eccentricity of the rotor. The rotor, at the worst, has the same degree of eccentricity as the bearings. In the case where a single bearing is used for the rotor shaft and the rotor is fixed, cantilever fashion, to one overhanging end of the shaft, a small eccentricity in the bearing may be multiplied into an eccentricity in the rotor, which exceeds the tolerance permissible. Therefore, the use of two widely spaced bearings located on opposite sides of the rotor and in the same member is most important.

It should also be noted that the invention also provides, as a desirable and preferred although not necessarily indispensable feature, anti-friction bearings for the support of the rotor shaft. While the prior art abounds in examples of anti-friction bearings of the ball or roller type for supporting rotor shafts, no one has heretofore provided the desirable arrangement herein shown, which enables the rotor to telescope the bearing sleeve and avoid the undesirable cantilever effect described and at the same time to be withdrawable from one end of the magneto without taking off one of the bearings or dismounting the rotor from its shaft. Here the two needle bearings of uniform diameter and of such small diameter as not to add materially to the diameter of the rotor are provided, located on opposite sides of the rotor in one single member. If ball bearings were used and all the other advantages above described secured, the sleeve 22 would need to be substantially larger in diameter to accommodate the two ball races and interposed balls. This would mean a greatly enlarged rotor diameter which in turn would mean that the pole pieces 24 would need to be more widely spaced and of greater length. Thus, the housing 15 would have to be much wider and higher and the compact arrangement (shown actual size in Fig. 1) could not be obtained. More than that, the magnets would need to be longer and much more iron would have to be used in the magnetic circuit and more powerful magnets would be required.

The invention thus affords a very compact arrangement of parts, condensed into the smallest space. The arrangement utilizes a minimum amount of materials in a most effective way. The design is such that the magneto may be manufactured in quantity at low unit cost and yet an exceedingly efficient machine, capable of giving long service with a minimum of attention and care is provided.

We claim:—

1. In a magneto, a frame, a core and pole pieces therefor supported in said frame, generating windings encompassing said core; a magnetic rotor comprising spaced shoes to cooperate with said pole pieces, permanent magnets of short bar form interconnecting the shoes, and a supporting body of non-magnetic material having a central, axially-directed opening therethrough and a sturdy flange located wholly on one side of said magnets and shoes; an elongated bearing sleeve rigidly fixed near its inner end in said frame and extending entirely through said rotor opening, a shaft for driving said rotor, said shaft having a part which is journalled in and supported entirely by said sleeve and another part extending outwardly beyond the outer end of said sleeve and terminating with a driving connection, said shaft having a sturdy flange abutting the rotor flange, and means rigidly securing said flanges together.

2. In a magneto, a hollow, box-like housing of non-magnetic material having a bottom wall, interconnected end and side walls rising from the bottom wall and an open upper end; laminated iron pole-piece elements fixed one in each side wall in opposed relation and extending vertically, a laminated iron core bridging the upper ends of said elements, generating windings encompassing said core, a cap closing the upper end of said housing, a magnetic rotor located below the core and between the pole pieces, one of said end walls having an opening aligned with the rotor and large enough to permit the rotor to be passed therethrough, an elongated bearing sleeve fixed near its inner end to the other end wall and extending toward the first named end wall and entirely through the rotor, a shaft journalled inside said sleeve and connected at a point beyond the outer end of the sleeve to the rotor, and covering means for enclosing said end wall opening and having an aperture through which one end of said shaft extends.

3. In a magneto, a hollow box-like housing having a bottom wall, interconnected end and side walls rising therefrom and an open upper end, said housing formed of cast, non-magnetic metal and having a hub extending inwardly from one end wall thereof, a bearing sleeve embedded at one end in the cast metal of said hub and extending from the inner end of the hub toward the other end wall, a magnetic rotor encompassing the exposed portion of said sleeve, a shaft journalled in said sleeve and projecting beyond the free end thereof and there fixed to the rotor, vertically-disposed laminated-iron pole-pieces partially embedded one in each of the side walls in opposed relation, the lower portions of said pole pieces formed to cooperate with the rotor and adapted to be alternately and magnetically connected and disconnected by said rotor, a core bridging the upper ends of said pole pieces and fixed thereto, generating windings carried by said core, and a cap closing the upper end of said casing.

4. In a magneto, a hollow box-like housing having a bottom wall, interconnected end and side walls rising therefrom and an open upper end, said housing formed of cast, non-magnetic metal and having a hub extending inwardly from one end wall thereof, a bearing sleeve embedded at one end in the cast metal of said hub and extending from the inner end of the hub toward the other end wall, a magnetic rotor encompassing the exposed portion of said sleeve, a shaft journalled in said sleeve and projecting beyond the free end thereof and there fixed to the rotor, vertically-disposed laminated-iron pole-pieces partially embedded one in each of the side walls in opposed relation, the lower portions of said pole pieces formed to cooperate with the rotor and adapted to be alternately and magnetically connected and disconnected by said rotor, a core bridging the upper ends of said pole pieces and fixed thereto, generating windings carried by said core, a cap closing the upper end of said casing, and a condenser mounted in one corner of said casing between said hub and one side wall.

5. In a magneto, a hollow, box-like housing of non-magnetic material having a bottom wall, interconnected end and side walls rising from the bottom wall and an open upper end; laminated-iron pole-piece elements fixed one in each side wall in opposed relation and extending vertically, a laminated-iron core bridging the upper ends of said elements, generating windings encompassing said core, a cap closing the upper end of said housing, a magnetic rotor rotatably mounted in the space below the core and between the pole pieces, said housing near one corner thereof having a ledge and a stud upwardly projecting therefrom, a condenser having a cartridge-like case and a spring-jaw terminal at one end, said condenser mounted with its axis vertically disposed in one corner of said housing with said terminal engaging said stud, and supporting means fixed to the housing and engaging the upper end of said condenser.

6. In a magneto, a magnetic rotor comprising, a pair of pole shoes mounted in spaced and opposed relation one on each side of the axis of rotation of the rotor, permanent magnets mounted in spaced relation on opposite sides of said axis and extending transversely of said axis and interconnecting the shoes, and a body of cast non-magnetic metal in the space between said magnets and shoes and interconnecting said shoes, the inner and adjacent faces of said shoes having recesses filled with said metal and of such form that said body and shoes are interlocked against radial separation, the shrinkage of said cast metal acting to press the shoes tightly against the ends of said magnets.

7. In a magneto, a magnetic rotor comprising, a pair of pole shoes mounted in spaced and opposed relation one on each side of the axis of rotation of the rotor, permanent magnets mounted in spaced relation on opposite sides of said axis and extending transversely of said axis and interconnecting the shoes, and a body of cast non-magnetic metal in the space between said magnets and shoes and interconnecting said shoes, the inner and adjacent faces of said shoes having recesses filled with said metal and of such form that said body and shoes are interlocked against radial separation, the shrinkage of said cast metal acting to press the shoes tightly against the ends of said magnets, said body of cast metal also engaging both end faces of the shoes and magnets and holding them against separation in the direction of said axis.

8. In a magneto, a magnetic rotor comprising, a pair of pole shoes mounted in spaced and opposed relation one on each side of the axis of rotation of the rotor, permanent magnets mounted in spaced relation on opposite sides of said axis and extending transversely of said axis and interconnecting the shoes, means for holding said shoes and magnets in assembled relation, and a body of cast non-magnetic metal in the space between said magnets and shoes and interconnecting said shoes, the inner and adjacent faces of said shoes having recesses filled with said metal and of such form that said body and shoes are interlocked against radial separation, the shrinkage of said cast metal acting to press the shoes tightly against the ends of said magnets, said body of cast metal also engaging both end faces of the shoes and magnets and holding them against separation in the direction of said axis, said means being embedded in and concealed by said body of cast metal.

9. In a magneto, stationary and movable elements effective on relative movement to produce a change of flux and cause the generation of an electromotive force, a frame supporting the stationary element, said movable element having an axial passage therethrough, an elongated bearing sleeve fixed near its inner end in said frame and extending therefrom through said passage in spaced concentrical relation therewith, said sleeve having axially-spaced bearings one near each end thereof and having a passage leading through it and opening into the interior of the sleeve at a point between said bearings and above the bottom portion of the sleeve, a shaft extending through said sleeve and beyond both ends thereof and journalled in said bearings, a flange on said shaft near one end thereof engageable with the outer end face of said sleeve as a thrust bearing and secured to the movable element, means driven from the other end of said shaft to deliver lubricant into said passage and thence into said sleeve for flow therein in opposite directions to said bearings and between said flange and the outer end of the sleeve, said flange closing the outer end of the rotor passage, whereby lubricant escaping from the outer end of said sleeve is compelled to flow back through said rotor passage.

10. In a magneto, stationary and movable elements effective on relative movement to produce a change of flux and cause the generation of an electromotive force, a frame supporting the stationary element, said movable element having an axial passage therethrough, an elongated bearing sleeve fixed near its inner end in said frame and extending therefrom through said passage in spaced concentrical relation therewith, said sleeve having axially-spaced bearings one near each end thereof and having a passage leading through it and opening into the interior of the sleeve at a point between said bearings and above the bottom portion of the sleeve, a shaft extending through said sleeve and beyond both ends thereof and journalled in said bearings, a flange on said shaft near one end thereof engageable with the outer end face of said sleeve as a thrust bearing and secured to the movable element, a lubrication reservoir, means driven from the other end of said shaft to deliver lubricant from said reservoir into said passage and thence into said sleeve for flow therein in opposite directions to said bearings and between said flange and the outer end of the sleeve, said flange closing the outer end of the rotor passage, whereby lubricant escaping from the outer end of said sleeve is compelled to flow back through said rotor passage, and means for directing the lubricant from the last named passage back to said reservoir.

11. In a magneto, stationary and movable elements effective on relative movement to produce a change of flux and cause the generation of an electromotive force, a frame supporting the stationary element, a shaft for the movable element having two axially spaced journal portions, said movable element having an opening extending axially therethrough and of a diameter less than twice the diameter of said journal portions, a thin-walled bearing sleeve fixed near one end to said frame and extending through said rotor opening in concentrical and closely spaced relation, said shaft fixed to said rotor and extending concentrically through said opening therein and into said sleeve, axially spaced bearings mounted inside the sleeve one near each end thereof, the journal portions of said shaft being rotatably mounted one in each said bearing, each said bearing comprising a plurality of cylindrical members each having a length many times its diameter and a diameter no greater than the radial thickness of said sleeve.

12. In a magneto, stationary and movable elements effective on relative movement to produce a change of flux and cause the generation of an electromotive force, a frame supporting the stationary element, a shaft for the movable element having two axially spaced journal portions, said movable element having an opening extending axially therethrough and of a diameter less than twice the diameter of said journal portions, a thin-walled bearing sleeve fixed near its inner end to said frame and extending through said rotor opening in concentrical and closely spaced relation, said shaft having a flange abutting the outer end of said sleeve as a thrust bearing and extending beyond said sleeve to close the rotor opening and overlap the rotor, means for securing said flange to the rotor, said shaft extending from one side of said flange through said rotor opening and into said sleeve in concentrical relation with each, said shaft extending outwardly from the other side of said flange for a driving connection, axially spaced bearings mounted inside the sleeve one near each end thereof, the journal portions of said shaft being rotatably mounted one in each said bearing, each said bearing comprising a plurality of cylindrical members each having a length many times its diameter and a diameter no greater than the radial thickness of said sleeve.

KENNETH A. HARMON.
RALPH W. CROCKER.